United States Patent [19]

Alifandi et al.

[11] 4,237,031

[45] Dec. 2, 1980

[54] CRYSTALLIZED SILICA-ALUMINA COGEL AND CATALYST EMPLOYING THE SAME

[75] Inventors: Hamid Alifandi, Woodland Hills; Dennis Stamires, Newport Beach, both of Calif.

[73] Assignee: Filtrol Corporation, Los Angeles, Calif.

[21] Appl. No.: 9,487

[22] Filed: Feb. 5, 1979

Related U.S. Application Data

[63] Continuation-in-part of Ser. No. 935,628, Aug. 21, 1978, Ser. No. 3,793, Jan. 1, 1979, and Ser. No. 3,879, Jan. 17, 1979.

[51] Int. Cl.³ .................. B01J 27/24; B01J 27/02; B01J 29/06; C01B 33/26
[52] U.S. Cl. .................. 252/438; 252/440; 252/455 R; 252/455 Z; 423/118; 423/328; 423/329
[58] Field of Search .................. 252/438, 440, 455 R, 252/455 Z; 423/328, 329, 118

[56] References Cited

U.S. PATENT DOCUMENTS

| | | | |
|---|---|---|---|
| 3,346,512 | 10/1967 | Gladrow et al. | 252/455 Z |
| 3,423,332 | 1/1969 | Maker et al. | 208/120 |
| 3,437,604 | 4/1969 | Michalko | 252/455 Z |
| 3,536,604 | 10/1970 | Joffe | 252/455 Z |
| 3,551,509 | 12/1970 | Thomas et al. | 252/455 Z |
| 4,085,069 | 4/1978 | Alafandi et al. | 252/455 Z |
| 4,139,493 | 2/1979 | Mickelson | 252/455 R |
| 4,142,995 | 3/1979 | Alafandi et al. | 252/455 Z |

*Primary Examiner*—Delbert E. Gantz
*Assistant Examiner*—William G. Wright
*Attorney, Agent, or Firm*—Philip Subkow; Bernard Kriegel

[57] ABSTRACT

This invention relates silica-alumina cogels containing a crystalline phase and to hydrothermally treatment of silica-alumina cogels resulting in generation of a crystalline phase in the gel and the employment of such crystallized gels as hydrocarbon conversion catalysts.

8 Claims, No Drawings

CRYSTALLIZED SILICA-ALUMINA COGEL AND CATALYST EMPLOYING THE SAME

BACKGROUND OF THE INVENTION

This application is a continuation-in-part of application, Ser. No. 935,628; filed Aug. 21, 1978, and application Ser. No. 003,793; filed Jan. 1, 1979, and 003,879 filed Jan. 17, 1979, and allowed Apr. 8, 1980.

Prior to the introduction of the exchanged crystalline zeolites of the faujasite type, as a catalyst for cracking of hydrocarbons, a commonly used catalyst was composed of a silica-alumina cogel containing from about 3 to about 25 percent by weight of $Al_2O_3$ on a volatile free basis.

Because of the substantially higher activity of the catalyst formed from crystalline alumino silicate zeolites, they have replaced to a large measure the silica-aluminum cogels as the primary component of a hydrocarbon conversion catalyst.

The literature relating to a silica-alumina gels and their catalytic properties is extensive (see Iler, "The Colloid Chemistry of Silica and Silicates", Chapter VI, Cornell Press [1955] Ed.) and citations here given. Milliken, et al., "Discussion Faraday Society" No. 8, "Heterogeneous Catalysis" p. 279, etc. (1950) Mills, et al., Journal of the American Chemical Society, vol. 72, pp. 1554-1556 (1950). See also: Erickson, U.S. Pat. No. 2,872,410; Winyall, U.S. Pat. No. 2,886,512; Wilson, U.S. Pat. No. 3,124,541; Magee, et al., U.S. Pat. No. 3,433,748; Haden, U.S. Pat. No. 3,065,054; Maher, et al, U.S. Pat. No. 3,423,332; Lussier, et al, U.S. Pat. No. 3,974,099.

The literature relating to such crystalline alumina silicates and catalysts incorporating the same is also extensive. See: Breck "Zeolite Molecular Sieves" (1974) John Wiley and Sons, Rabo "Zeolite Chemistry and Catalyses" ACS Monogrape 171.

STATEMENT OF THE INVENTION

In the parent application, Ser. No. 935,628, and in the above copending application, is disclosed our inventions which include the hydrothermal treatment of ammoniated silica-alumina gels of preferred $SiO_2/Al_2O_3$ ratio in the presence of monovalent cations such as H, $NH_4$ or polyvalent cations. The treatment results in a deammoniated gel of much improved catalytic activity.

Depending on the conditions of the treatment, the resultant gel may be amorphous or develop a crystalline phase.

This invention relates to the hydrothermal treatment of ammoniated silica-alumina cogel under acid conditions in the presence of a rare earth cation under conditions to develop a crystalline phase and to produce a deammoniated gel of improved catalytic activity. The treatment results in a reduction in the content of ammonium cation associated with the gel and an introduction of the polyvalent cations. The treatment under controlled hydrothermal conditions may result in the generation of an in situ crystalline phase. Under less intense hydrothermal conditions, no crystalline phase appears. The gel remains amorphous. The treated gel, reduced in ammonium ion content and carrying associated therewith rare earth cations, in our preferred embodiment will have catalytic activity which is superior to the original cogel.

The cogel which we prefer to treat by the process of our invention to form the catalyst of our invention may be produced by any of the methods used in the prior art to form such cogels in which the treatment results in a gel having an ammonium ion associated with the gel. Such procedures are well known in this art.

The catalytic activity of the exchanged cogel of our invention is improved by controlling the silica to alumina ratio of the cogel. The catalytic activity attainable by our invention is substantially greater as the molar ratio of $SiO_2/Al_2O_3$ is less than 3 and preferably more than 1. For purposes of producing the crystalline phase in the alumina-silica gel according to our invention, the preferred ammoniated cogel is one containing a silica-alumina cogel of more than 1 and less than 2 to produce a hydrothermally treated gel having a $SiO_2/Al_2O_3$ molar ratio in the range of more than 1 and less than 2 for example, as in the examples infra, about 1.5 to about 1.7.

The crystalline phase, produced by hydrothermal treatment of the gel under various conditions in the presence of rare earth cations has a characteristic in common in that the lattice has d spacings as set forth below. The x-ray pattern may contain peaks which depart from the above pattern due to differences in treating conditions, distortions or instrumental artifacts as will be understood by those skilled in this art.

The exchanged gel which contains the cogel as a matrix for the in situ generated crystalline phase, may be combined with additional matrix material, such as clays, for example, kaolin, ball clay or halloysite or acid treated halloysite or inorganic oxides such as silica gel or for example, the hydrated aluminas such as pseudoboehmite. Such matrix materials may be used in ratios of from about 5% to 95% of the mixture of the exchanged gel of our invention and the matrix on a volatile free basis. This may be also combined with the zeolites which have been used in the prior art as cracking catalysts including also the matrix material employed in the prior art with such zeolites.

The index of merit as to activity of cracking catalysts is the volume percent conversions determined by a microactivity test herein identified. The higher the volume percent conversion, after various temperature levels of high temperature steaming, the more active is the catalyst.

The activity may be measured by the microactivity cracking test described in the Oil and Gas Journal of September 26, 1966, page 84, etc., and November 22, 1975, page 60, etc.

In the following examples where activity is referred to the above test is employed, the conditions were as follows. The calcined pelleted catalyst was first steamed at temperatures and times specified below and then used in cracking of a petroleum fraction under the following conditions. Oil charge was a wide boiling range high sulfur feed stock (boiling range about 430° to 1000° F.). The catalyst to oil ratio equals 4. The weight hourly space velocity equals 16.45 grams of oil per gram of catalyst per hour. The temperature of the reactor is 910°. The percent conversion is reported as percent by volume of liquid charge. The percent conversion after calcination of the catalyst in air three hours at 1050° F. and steamed for 2 hours at 1450° F. prior to testing, the percent conversion is reported as M activity. Another sample is steamed for 2 hours at 1500° F., and the volume percent conversion is reported as S activity. When another sample is steamed for 1550° F., for 2 hours prior to testing, the volume percent conversion is reported as S+ activity.

The ammoniated gel is reacted with the rare earth salt solutions at an acid pH in the range of about 4 to less than about 6 so that the rare earth ions are not precipitated as a separate compound and the rare earth cations become associated with the gel.

For purposes of describing the result of the process of treating the ammoniated gel with a water solution of the rare earth salt, whereby the $NH_4$ content of the gel is reduced, we refer to the process as an "exchange" and the cations as "associated with the gel."

The preferred exchange results in the production of a silica-alumina cogel which has a sodium content of less than 1% and preferably less than 0.5% by weight of the gel expressed as $Na_2O$ on a volatile free basis, and a $NH_4$ content of less than about 0.3 equivalents of $NH_4$ per mole of $Al_2O_3$ in the gel. Preferably the $NH_4$ content is less than 0.2 equivalents per mole of $Al_2O_3$.

The exchange in the case of rare earth cations is carried out to associate the rare earth expressed as ReO, in the range of about 0.1 to about 0.4 equivalents per mole of $Al_2O_3$ in the treated cogel. Preferably, the exchange is conducted at a temperature in excess of the atmospheric boiling point and for a period of time and concentration of reactants so as to develop a crystal structure whose x-ray pattern is characterized by reflections corresponding to the following "d" spacings.

Table 1 d (Angstroms)

6.2±0.1
4.58±0.05
3.57±0.03
3.14±0.02
3.00±0.02
2.85±0.02

Depending on the duration of treatment, additional lines may appear and the intensities of the corresponding peaks may, as to some, be amplified, and as to others, they may be diminished.

For purposes of forming a catalyst for conversion of hydrocarbons such as petroleum fractions, we prefer to hydrothermally treat the ammoniated silica-alumina cogel in the presence of a water solution of the salts at above the atmospheric boiling point, for example, about 250° F. to about 450° F., under superatmospheric pressure in a closed vessel.

A prolongation of treatment or treatment at more elevated temperature results in the development of additional planes in the lattice in addition to those corresponding to Table 1.

Under more rigorous conditions for example at temperatures in excess of 400°, i.e. 500° to 550°, result in the generation of a crystalline phase whose x-ray spectrum contains a substantial number peaks which do not appear in the x-ray of the crystalline phase generated at lower temperatures or lesser reaction time. Extended digestion at the higher temperatures results in the formation of a crystalline phase in which the planes developed at lower temperatures do not appear in the x-ray spectrum. Some peaks are of lowered intensity and others are missing as compared with the x-ray pattern of the gel exchanged at lower temperatures or for shorter periods of time. The activity of the gel treated at the lower temperature is materially greater than that treated at the higher temperature.

EXAMPLE 1

The preferred ammoniated silica-alumina gel is prepared as follows:

5,017 Grams of sodium silicate (28% $SiO_2$-8.9% $Na_2O$ by weight) equivalent to 1,440 grams of $SiO_2$ is dissolved in water. The slurry solution is acidified to a pH of 11 with sulfuric acid; 26,896 grams of an aluminum sulfate solution (equivalent to 1,560 grams of $Al_2O_3$) is added gradually to the acidified slurry with constant agitation.

The pH at the end of the addition of the aluminum sulfate should be in the range of about 3 to about 3.5. The solution is passed through a colloid mill to be well homogenized. The homogenized solution is made alkaline with ammonium hydroxide with constant and vigorous agitation to adjust the mixture to a pH of about 8.5 to about 9.

The mixture is vigorously stirred and the pH is maintained in the range of about 8.5 to about 9 by suitable adjustment for about 1 hour to insure uniformity of the mixture. It is then heated to a temperature of about 75° to 85° C. for about 30 minutes and then immediately filtered and the filter cake washed with hot distilled water of about 80° C. The wash slurry is then slurried to a solid content of about 5% in distilled water which contained about 2% of ammonium nitrate and then filtered. The filter cake is then again slurried with ammonium nitrate solutions as in the last previous step. The filter cake from the last step is again reslurried in an ammonium nitrate solution as above and filtered. The filter cake from the last filtration above is washed with distilled water.

The silica-alumina gel thus produced is preferably maintained in a sealed container prior to use in the catalyst of our invention.

The gel is produced in Example 1 analyzed on a volatile free basis as follows:

$SiO_2$ = 48.7% by weight
$Al_2O_3$ = 51.5% by weight
$Na_2O$ = 0.27% by weight
$NH_3$ = 3.67% by weight The equivalents of $NH_4$ in the gel is 0.43 equivalents per mole of $Al_2O_3$.

The gel, when subjected to x-ray employing K copper radiation at 500 counts per second in the counter of the x-ray apparatus, showed no discernable peaks and appeared to be amorphous.

EXAMPLE 2

The above cogel was pelleted and tested by a microactivity test identified above after steaming at 1450° F. for two (2) hours (M activity) and again another sample after steaming at 1500° F. for two (2) hours (S+ activity). The results are reported as volume percent conversion. The results obtained were as follows:

|  | M | S | S+ |
|---|---|---|---|
| Volume % conversion | 43.0 | 36.5 | 39.9 |

The gel was also mixed with acid treated halloysite (see Secor, U.S. Pat. Nos. 2,935,463 and 3,446,727) in the ratio of 90% by weight of the dried gel and 10% by weight of the dry halloysite. The mixture was tested as above with the following results:

| | M | S+ |
|---|---|---|
| Volume % conversion | 47 | 44 |

The following example illustrates the effect of exchanging with rare earth at temperatures below boiling.

The rare earth sulfate expressed as oxides and symbolized as ReO was composed of the sulfates of lanthanum, cerium, neodymium and other rare earth metals for example praesiodimuma. The equivalent value of the mixture of the above metals, expressed as their oxides (ReO) is 52.74 grams per said equivalent, that is 100 grams of ReO (volatile free) is equal to 1.896 equivalents of ReO.

EXAMPLE 3

1,600 Grams of the cogel prepared as in Example 1 (calculated on a volatile free basis) was mixed gradually with 18.4 liters of rare earth sulfate solution containing 1.96% of rare earth oxides ReO while the mixture was maintained at a pH of 5 by adjusting during the mixing. The ratio of the grams ReO per 100 grams of the cogel in a volatile free basis was 22 grams ReO as percent of the weight of the gel. The above slurry was then introduced into an autoclave and heated at a temperature 400° F. for 2 hours indicated in Table 2. The mixture was then cooled and filtered. The filter cake was washed until the wash water appeared substantially free of sulfate ions. The filter cake was analyzed on a volatile free basis. This is equivalent to 0.04 equivalents of $NH_4$ per mole of $Al_2O_3$. The filter cake was analyzed as follows:

$SiO_2$ = 48.8% by weight
$Al_2O_3$ = 45.6% by weight
ReO = 4.15% by weight
$NH_3$ = 0.3% by weight
$Na_2O$ = 0.06% by weight
$SO_3$ = 0.67% by weight.

The cogel treated as stated was mixed with 10% of acid treated halloysite and 90% of the cogel all measured on a volatile free basis as in Example 2 and subjected to the above activity test as set forth in Example 2. The results were as follows:

TABLE 2

| d | I |
|---|---|
| 6.39 | 6 |
| 6.26 | 24 |
| 4.58 | 3 |
| 3.57 | 3 |
| 3.49 | 3 |
| 3.41 | 2 |
| 3.24 | 2 |
| 3.14 | 3 |
| 3.00 | 10 |
| 2.86 | 3 |
| 2.43 | 2 |
| 2.21 | 6 |

The filter cake was x-rayed as in Example 1 and the d spacings and intensities of the corresponding lines measured as the height of the peaks on the strip chart were determined.

| | M | S | S+ |
|---|---|---|---|
| Volume % conversion | 77.1% | 61.5% | 55.5% |

EXAMPLE 4

The temperature and time conditions and other procedures of Example 3 were followed in this example except that the ratio of rare earth sulfate to the gel on a volatile free basis was in the ratio of 10 grams of ReO per 100 grams of the gel, on a volatile free basis.

Five samples were prepared at different durations of digestion but otherwise on the same conditions to wit, sampled after 15 minutes (Sample 1), 35 minutes (Sample 2), 45 minutes (Sample 3), 1 hour (Sample 4), and 2 hours (Sample 5).

The "d" spacings and peak intensitites were as shown in Tables 3 and 4.

The x-ray spectrographs were made under the same conditions employing K alpha copper radiation as in Example 1.

It is noted that although many of the peaks in the spectrum in Table 3, for Samples 1 through 4, are absent from the spectrum of Table 1 and 2, they include the "d" spacings in Table 1 common to Samples 1 through 4 and those of Table 2. The "d" spacings of Sample 5 (Table 4) appears to be a crystal whose lattice is substantially different from the crystal of Samples 1 through 4 and of Example 3. It has however, a very good activity and is especially very stable, as evidenced by its high S+ activity. While we do not wish to be bound by any theory of the nature of the change, it does appear that the prolonged digestion of the gel of Samples 1 through 4 has resulted in a transformation of the crystal formed during an earlier part of the digestion as the digestion is prolonged from one (1) hour for Sample 4 to two (2) hours for Sample 5. While the spectrum of Sample 5 is different from Example 3, it is an active catalytic crystallized gel. The activity of the catalyst while less than that of Example 3 is substantial and higher than that of the original gel.

TABLE 3

| Sample 1 | | Sample 2 | | Sample 3 | | Sample 4 | |
|---|---|---|---|---|---|---|---|
| d | I | d | I | d | I | d | I |
| 14.60 | 2 | | | 14.25 | 2 | | |
| 6.28 | 10 | 6.29 | 48 | 6.29 | 41 | 6.28 | 39 |
| 4.58 | 3 | 4.58 | 5 | 4.58 | 4 | 4.58 | 4 |
| 4.00 | 2 | 4.00 | 2 | 4.00 | 2 | | |
| | | 3.70 | 2 | 3.71 | 2 | | |
| 3.56 | 3 | 3.57 | 4 | 3.58 | 5 | 3.56 | 2 |
| | | 3.50 | 2 | 3.51 | 2 | | |
| | | 3.35 | 2 | | | | |
| 3.24 | 6 | 3.24 | 5 | 3.25 | 3 | 3.24 | 6 |
| 3.14 | 14 | 3.14 | 6 | 3.15 | 3 | 3.14 | 7 |
| 3.01 | 3 | 3.01 | 4 | 3.01 | 4 | 3.01 | 2 |
| 2.97 | 3 | | | 2.97 | 3 | 2.97 | 3 |
| 2.85 | 5 | 2.85 | 4 | 2.84 | 3 | 2.84 | 7 |
| 2.78 | 3 | | | 2.78 | 2 | 2.77 | 1 |

TABLE 4

| Sample 5 | |
|---|---|
| d | I |
| 8.44 | 44 |
| 4.75 | 4 |
| 4.47 | 5 |
| 4.24 | 4 |
| 4.16 | 3 |
| 3.96 | 3 |
| 3.76 | 3 |
| 3.26 | 4 |
| 3.04 | 3 |
| 2.33 | 1 |

The gel which was digested for 2 hours (Sample 5) had the following analysis:
$SiO_2 = 44.0\%$ by weight
$Al_2O_3 = 47.6\%$ by weight
$ReO = 6.81\%$ by weight
$NH_3 = 0.75\%$ by weight
$Na_2O = 0.06\%$ by weight
The equivalents of $NH_4$ per mole of $Al_2O_3$ is 0.1.

The crystallized gel was formulated to a catalyst with acid treated halloysite and tested for activity as in Example 2 with the following results:
M = 68.9%
S+ = 61.6%

The activity of the gel, which was digested for 2 hours, is greatly superior, both at the M level and the S+ level than the original gel.

EXAMPLE 5

Example 3 was repeated employing a higher ratio of rare earth sulfate to the cogel. 33 grams, expressed as ReO per 100 grams of the cogel on a volatile free basis was digested for the following periods each at 500° F. One gel was digested and sampled after 8 hours (Sample 1), another after 12 hours (Sample 2), another after 16 hours (Sample 3), another after 20 hours (Sample 4), and another after 24 hours (Sample 5). The filter cakes from each was analyzed and the d spacings and peak intensity was determined as in Example 3 (see Table 3).

The eight hour sample and the 24 hour sample filter cakes were analyzed, with the following results:

|  | 8 hours | 24 hours |
|---|---|---|
| $SiO_2$ | 40.6% by weight | 44.6% by weight |
| $Al_2O_3$ | 44.3% by weight | 45.2% by weight |
| ReO | 8.53% by weight | 9.08% by weight |
| $NH_3$ | 0.55% by weight | 1.17% by weight |
| $Na_2O$ | 0.083% by weight | 0.17% by weight |

Table 5 states the "d" spacings and intensities of the x-ray spectrum taken as in Example 1.

TABLE 5

| Sample 1 | | Sample 2 | | Sample 3 | | Sample 4 | | Sample 5 | |
|---|---|---|---|---|---|---|---|---|---|
| d | I | d | I | d | I | d | I | d | I |
| 14.18 | 3 | | | | | | | | |
| 7.40 | 4 | | | 7.46 | 5 | 7.46 | 5 | | |
| 7.19 | 11 | 7.22 | 13 | 7.22 | 8 | 7.22 | 12 | 7.23 | 14 |
| 6.97 | 1 | 6.99 | 2 | | | | | | |
| | | | | | | | | 6.47 | 10 |
| 6.25 | 38 | 6.26 | 43 | 6.27 | 49 | 6.28 | 44 | 6.30 | 5 |
| 5.89 | 2 | 5.89 | 2 | 5.90 | 2 | | | | |
| | | | | | | | | 4.80 | 12 |
| 4.56 | 16 | 4.56 | 14 | 4.58 | 15 | 4.58 | 16 | | |
| 4.46 | 12 | 4.45 | 16 | 4.48 | 5 | 4.47 | 11 | 4.47 | 24 |
| 4.41 | 2 | | | | | | | | |
| 4.37 | 5 | 4.37 | 5 | 4.38 | 5 | 4.38 | 5 | 4.38 | 7 |
| 4.21 | 5 | | | | | | | | |
| 4.16 | 8 | 4.16 | 7 | 4.17 | 9 | 4.18 | 7 | 4.17 | 10 |
| 4.09 | 5 | 4.10 | 2 | 4.10 | 4 | | | | |
| 3.98 | 14 | 3.99 | 3 | 3.99 | 12 | 3.99 | 9 | | |
| 3.77 | 3 | 3.80 | 3 | 3.82 | 4 | 3.80 | 3 | 3.81 | 5 |
| | | | | 3.61 | | | | 3.68 | 2 |
| 3.56 | 22 | 3.55 | 19 | 3.55 | 19 | 3.55 | 21 | 3.54 | 12 |
| 3.49 | 6 | 3.49 | 5 | 3.49 | 4 | 3.49 | 4 | | |
| | | | | 3.38 | 1 | | | 3.37 | 1 |
| 3.33 | 5 | 3.34 | 4 | 3.33 | 4 | 3.33 | 4 | | |
| 3.23 | 19 | 3.23 | 15 | 3.24 | 14 | | | 3.25 | 4 |
| 3.15 | 8 | 3.14 | 7 | 3.14 | 10 | 3.14 | 8 | | |
| 3.00 | 20 | 3.00 | 18 | 3.00 | 16 | 3.00 | 15 | 3.00 | 2 |
| 2.96 | 8 | 2.96 | 9 | 2.96 | 10 | 2.97 | 10 | | |
| 2.94 | 3 | 2.94 | 2 | 2.94 | 8 | 2.94 | 3 | 2.92 | 2 |
| 2.88 | 2 | 2.88 | 1 | 2.88 | 1 | 2.88 | 1 | | |
| 2.84 | 18 | 2.84 | 16 | 2.84 | 17 | 2.84 | 19 | 2.84 | 1 |
| 2.77 | 7 | 2.77 | 8 | 2.77 | 7 | 2.77 | 6 | 2.77 | 2 |
| 2.62 | 7 | 2.60 | 5 | 2.61 | 8 | 2.61 | 6 | | |
| 2.56 | 9 | 2.56 | 8 | 2.56 | 8 | 2.56 | 8 | 2.56 | 13 |
| 2.54 | 1 | 2.54 | 2 | 2.53 | 3 | 2.54 | 2 | | |
| 2.51 | 3 | 2.51 | 3 | 2.51 | 4 | 2.51 | 4 | 2.50 | 7 |
| 2.33 | 9 | 2.33 | 11 | 2.33 | 4 | 2.34 | 9 | 2.33 | 13 |
| | | | | 2.31 | 10 | | | | |

Thus while the "d" spacings of Table 1 which appear in Table 2 are also present in the "d" spacings of Samples 1 through 4 of Table 4, the prolonged treatment in the case of Sample 5 has developed additional planes. The resultant crystallized gel although also deammoniated has an activity which is inferior to the activity of Example 3. As the digestion is prolonged, certain of the peaks become diminished in intensity and others disappear (compare Sample 5 with Samples 1 through 4). The activity of Sample 5, although substantially deammoniated, is substantially inferior to those of Example 3 and of Sample 1.

The 8 hour and the 24 hour sample were each employed and tested for activity as in Example 2 with the following results:

| 8 hour | M = 53% | S+ = 41% |
|---|---|---|
| 24 hour | M = 46.4% | S+ = 43.1% |

EXAMPLE 6

Example 4 was repeated but the temperature was adjusted to 550° F. and the digestion was carried out for 8 hours. The treated gel was x-rayed as in Example 1. The d spacings and intensities of the peaks were determined (see Table 6).

TABLE 6

| d | I |
|---|---|
| 6.28 | 12 |
| 4.58 | 6 |
| 4.00 | 8 |
| 3.57 | 3 |
| 3.49 | 3 |
| 3.41 | 2 |
| 3.24 | 2 |
| 3.14 | 8 |
| 3.00 | 5 |
| 2.86 | 3 |
| 2.21 | 1 |

The higher temperature, as compared with Sample 1 of Table 4 acted like the prolongation of treatment as in Example 4, as is evidenced by the smaller peak intensities compared with Example 4, Sample 1.

The following example illustrates the qualities of the catalysts produced by a combination of the crystallized gel of our invention with a crystalline alumino-silicate faujasite zeolite. Such novel composite catalysts have a superior hydrothermal stability and catalytic activity to produce a high octane gasoline.

Example 7 illustrates the excellent activity of the mixture of the rare earth exchanged alumina-silica gel of our invention in a mixture with a faujasite type zeolite.

EXAMPLE 7

A Na Y zeolite having an $SiO_2/Al_2O_3$ ratio of 4.74 was dispersed in water and acidified with sulfuric acid to a pH of about 3.5. The resultant slurry was heated to a temperature of 160° F. to 180° F. with a rare earth salt solution employing the rare earth sulfate of Example 3.

The washed filter cake of the above slurry was analyzed and contained 10.8% ReO and 3.8% $Na_2O$ on a volatile free basis. The 19% of the exchanged zeolite 47% ball clay when formulated with 16% acid treated halloysite and 18% pseudoboehmite in a slurry and spray dried and tested by the above microactivity test with the following results:

M=73%
S+=30%

A portion of the above filter cake was mixed with the washed filter cake of the exchanged silica-alumina gel of Example 10 in the ratio to give 10% rare earth exchanged Y zeolite and 90% of the exchanged gel on a volatile free basis. The slurry of the mixed filter cakes was dried.

The resultant catalyst containing the zeolite and gel was tested by the above microactivity test with the following results:

M=83%
S+=73%

This activity may be compared with that of the catalyst referred to previously in this Example 23. The spray dried slurry of the mixed filter cake as above, was tested by the fluid cracking test.

A test oil (ASTM Subcommitted D32, Standard FHC 893) is vaporized and passed through a bed of microspheres produced by the above spray drying of the mixed filter cakes. Spray dried microspheres are of a particle size within the range of 50 to 70 microns.

In the particular test, the catalyst charge was 4.00±0.05 grams and 1.33±0.03 grams of oil was passed through the catalyst bed over a period of 75 seconds. The catalyst was prepared by heating a shallow bed of the catalyst for three hours in air at 1050° F. and then steamed as in the above microactivity test at 1450° F. for two (2) hours and another sample was steamed at 1550° F. for two hours. The oil passed through a preheat zone and through a bed of the microspheres maintained at a temperature of 900° F.±2° F. at a weight hourly space velocity (WHSV) of 16.

$$WHSV = \frac{1.33}{4} \times \frac{3600}{75} = 16$$

The vapors and gases passing from the bed are condensed in an ice bath and the uncondensed gases collected over water.

The following observations are made. The weight of the condensate and the volume and temperature of the gases are determined. The liquid condensate fraction is analyzed and the percent by weight of the liquid fraction which boiled above 421° F. and the fraction of the liquid condensate boiling below 421° F., is determined. The volume and temperature of the gases collected over the water are measured and the volume reduced to standard conditions. The uncondensed gases are analyzed and the weight percent of the gases which is hydrogen, isopentane, and hexame is determined and their weight percent of the feed determined. The weight percent conversion of the liquid charge is determined from the following relation:

F is the weight in grams of the oil passing through the reactor:
L is the weight in grams of the liquid product which is collected as condensate;
R is the percent by weight in grms of the fraction of the liquid condensate which boils above 421° F.;
H is the grams of liquid held up in the reactor exit line and around the reactor, receiver, and joints.

In the above test it has been determined that H constitutes three percent (3%) of the feed F. The weight percent conversion (%C) is given by the following relationship.

$$\%C = \frac{F - \frac{R \times L}{100} - .03H}{F} \times 100$$

The weight percent of the gasoline is given by the sum of the percent by the weight to the fraction boiling below 421° F. and the weight percent of the isopentane and hexane.

The coke which is deposited on the catalyst is obtained by burning the coke off the catalyst remaining after the test and the weight of carbon deposited is determined from the $CO_2$ generated. The weight percent of the feed which appears as carbon is thus determined.

The spray dried microspheres which were heated with steam at 1450° F. and another sample which was heated at 1550° F. each for two (2) hours as above, were each tested by the above test with the following results:

| °F. | Conversion Wt. % | Gasoline % | Coke % | Hydrogen | Isobutane |
|---|---|---|---|---|---|
| 1450° | 72.7% | 45.4% | 6.60% | .077 | 5.18 |
| 1550° | 57.1% | 36.51% | 5.73% | .082 | 2.29 |

The gasoline had a 90.6 octane value according to the test procedure described in: Anderson, et al, "Calculation of the Research Octane Number of Motor Gasoline from Gas Chromatograph Data and a New Approach to Motor Gasoline Quality Control", Journal of Institute of Petroleum, Vol. 53, March 1972, pp. 83–94.

When using the above exchanged ammoniated gel with a zeolite, we prefer to use the exchanged gel to be mixed with the rare earth exchanged zeolites of the prior art with an $Na_2O$ content of less than about 4–5%, for example 3.5% and preferably the so-called A type pseudoboehmite (see Patent 4,100,108); we prefer to employ the Y zeolite of an $SiO_2/Al_2O_3$ ratio of above 4, for example, 4.5. The percent of the zeolites and the gel on a volatile free basis may be about 5% to 25% of the mixture, the exchanged gel.

Our invention relates to a process of the combination of a CAS zeolite with a hydrolytically treated silica-alumina cogel. The hydrolytic treatment may be that of acid silica-alumina gels or ammoniated silica-alumina gels of low sodium content. The gels in the combination have a weight ratio in the range of less than about 1% expressed as $Na_2O$ and having an $SiO_2/Al_2O_3$ mole ratio less than 4 and preferably in the range of about 1 to about 3. In the case of the ammoniated gels, containing $NH_4$ cations associated with the gel in amount expressed as equivalents of $NH_4$ per mole of $Al_2O_3$ in excess of about 0.3 to reduce the content of $NH_4^+$ to substantially less than about 0.3 equivalents per mole of $Al_2O_3$.

The preferred embodiment of our invention includes the treatment of an ammoniated gel with rare earth cations under acid conditions to reduce the $NH_4$ ion content in the gel to less than about 0.15 equivalents of $NH_4$ per mole of $Al_2O_3$ and to employ for such purposes a cogel with a $SiO_2/Al_2O_3$ molar ratio substantially more than 1 and less than 3 and its combination with a suitable CAS zeolite.

We prefer to carry out the hydrothermal treatment under autogenous pressure at temperature up to about 450° F., i.e., 225° F. to about 450° F., and to generate in the cogel an in situ crystalline phase characterized by "d" spacings according to Table 1.

The preferred crystallized gel is one which has a silica-alumina mole ratio of more than about 1 and up to about 2 and a $NH_4$ content of less than about 0.15 equivalents per mole of $Al_2O_3$ and rare earth cations of about 0.5 to about 5 equivalents per mole of $Al_2O_3$ and an x-ray spectrum which includes the "d" spacings of Table 1.

The time of digestion is controlled so as not to be excessive as described above. The duration of treatment to produce the above crystal phase may be determined by periodic sampling and x-ray examination as described above.

Our invention also relates to the combination of a crystalline alumino silicate (CAS) with the zeolite and crystallized silica-alumina gel of our invention.

Instead of employing the exchange zeolite and the hydrothermally treated gel as in Example 7 the sodium CAS zeolite, for example, the rare earth exchanged Y of Example 7 is mixed with the slurry of the washed filtered ammoniated gel of Example 1, the combination may be made by hydrothermally treating the CAS zeolite and separately prepared gel with an acid solution of a rare earth salt as described above.

The mixture is digested as in the above Examples 3 through 6, either with rare earth salts including a preliminary or subsequent exchange with H or $NH_4$ or other polyvalent cations to reduce the sodium content of the CAS, gel combination preferably to less than 1% expressed as $Na_2O$ based on the zeolite and gel on a volatile free basis and to generate the crystal phase of our invention.

Preferably we carry out the exchange of the mixed CAS zeolite and cogel under superatmospheric pressure and rare earth cations at temperatures of about 250° F. to 450° F. to reduce the sodium content to less than about 2% (expressed as $Na_2O$) based on the CAS and preferably less than 1% based on the CAS zeolite gel mixture on a volatile free basis and to reduce the ammonium content to less than 0.2 equivalents of $NH_4$ per mole of $Al_2O_3$ based on the gel in the catalyst.

The treated mixture of exchanged crystalline alumino-silicate zeolite and the exchanged gel is washed until the wash water is substantially free of the anion used in the exchange process and the washed filter cake is spray dried.

An alternative procedure, described in our same copending application, Ser. No. 769,118, now U.S. Pat. No. 4,142,995 incorporated herein by this reference, according to our invention, is to combine the sodium containing CAS zeolite, for example Na Y with the ingredients used to form the alumina/silica cogel and to exchange the mixture with a solution containing ammonium cation. Thus, the process of Example 1 may be carried out by mixing the gel forming ingredients with the CAS zeolite. The mixture may be made alkaline with ammonium hydroxide as in Example 1.

The encapsulated gel zeolite thus formed, may be further exchanged with ammonium salt filtered and washed. The wash slurry may then be hydrothermally treated as in Examples 3 through 21, of the above-identified application.

Preferably the exchange is carried out under superatmospheric conditions at a temperature of about 205° F. to 450° F. with a rare earth salt solution to reduce the sodium content (expressed as $Na_2O$) to less than about 1% based on the zeolite and gel on a volatile free basis and an $NH_4$ content of less than 0.2 equivalents of $NH_4$ per $Al_2O_3$ of the gel component as above.

The above gel-zeolite combination may be combined with other matrix materials such as in ratio to include from about 5 to about 30% of the zeolite and from about 20 to about 50% of the gel, treated as above, the remaining portion may be clays and other inorganic oxides such as have been employed in catalysts employing CAS zeolites.

The gel-zeolite combination prior to exchange or after partial exchange of the zeolite or zeolite gel combination may be spray dried and the spray dried microspheres further exchanged according to the procedures of Examples 3 through 6.

The catalyst may be employed not only as cracking catalysts to produce gasoline of a superior octane, but may be used in other hydrocarbon conversion processes, such as hydroforming, hydrocracking, hydrodesulfurizing processes, for which zeolite catalysts or a silica-gel catalysts have been employed in the prior art. In this connection, the zeolite-gel combination of our invention may be promoted by addition of metal or metallic oxides or sulfides or other compounds employed to promote the activity of crystalline zeolites or gel catalysts for such purposes.

We claim:

1. An ammoniated silia-alumina gel having an $SiO_2/Al_2O_3$ molar ratio more than 1 and less than 3 and containing less than 0.3 equivalents of $NH_4$ cations per mole of $Al_2O_3$ in the gel and rare earth cations and a crystalline phase having "d" spacings according to Table 1.

2. An ammoniated silica-alumina gel having an $SiO_2/Al_2O_3$ molar ratio in the range of in excess of 1 and less than about 2.5 and containing ammonium cation in amount substantially less than 0.3 equivalents per mole of $Al_2O_3$ and sodium expressed as $Na_2O$ of less than about 1% by weight of the exchanged gel on a volatile free basis and a crystalline phase having "d" spacings according to Table 1.

3. An ammoniated silica-alumina gel of $SiO_2/Al_2O_3$ ratio or more than 1 and less than 3 and containing less than 0.3 equivalents of $NH_4$ cations and from about 0.1 to more than 0.4 equivalents of rare earth cations expressed as ReO cations per mole of $Al_2O_3$ in the gel and a crystalline phase having "d" spacings according to Table 1.

4. An ammoniated silica-alumina gel having an $SiO_2/Al_2O_3$ molar ratio in the range of more than 1 and up to about 2 and containing less than about 1.5 equivalents of ammonium cation per mole of $Al_2O_3$ in the gel and from about 0.1 to more than 0.4 equivalents of ReO per mole of $Al_2O_3$ and sodium expressed as $Na_2O$ of less than about 0.5% by weight of the gel on a volatile free basis and a crystalline phase having "d" spacings according to Table 1.

5. The gel of claims 1, 2, 3, or 4, in which the $NH_4$ content is less than about 0.15 and the rare earth cations are in the range of about 0.5 to about 5 equivalents per mole of $Al_2O_3$ in the gel.

6. A silica-alumina gel having an $SiO_2/Al_2O_3$ molar ratio in the range of about 1 to about 3 and a crystalline phase characterized by a "d" spacing according to Table 1.

7. A silica-alumina gel according to claim 6, associated with rare earth cations.

8. The gel of claim 7 in which the concentration of the rare earth cations is in the range of about 0.5 to about 5 equivalents per mole of $Al_2O_3$.

* * * * *